Jan. 17, 1939.  A. ROSENTHAL  2,144,084
LABEL CUTTING AND FOLDING MACHINE
Filed June 1, 1937  9 Sheets-Sheet 1

INVENTOR.
Arthur Rosenthal
BY Earl + Chappell
ATTORNEYS.

Jan. 17, 1939.   A. ROSENTHAL   2,144,084
LABEL CUTTING AND FOLDING MACHINE
Filed June 1, 1937   9 Sheets-Sheet 2
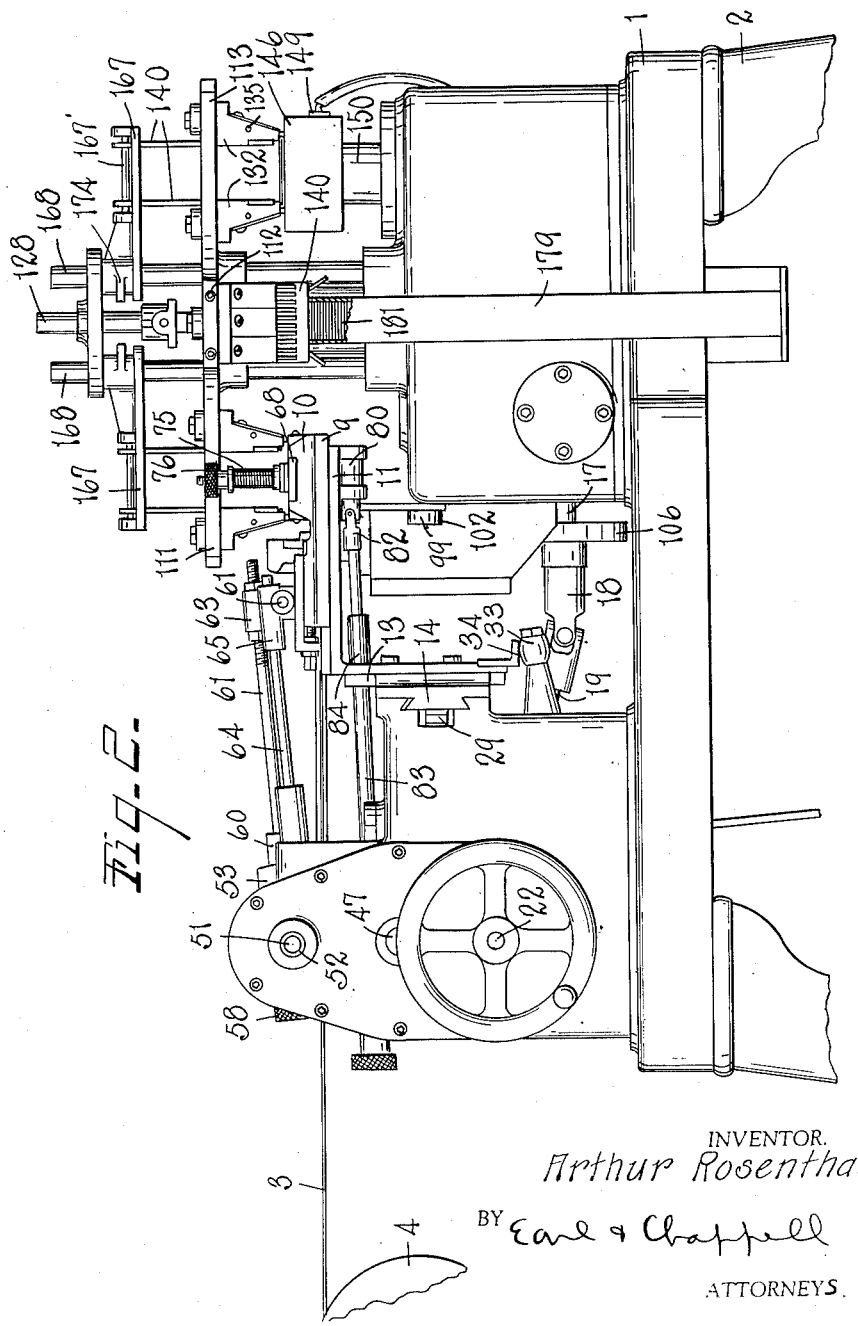
INVENTOR.
Arthur Rosenthal
BY Earl & Chappell
ATTORNEYS.

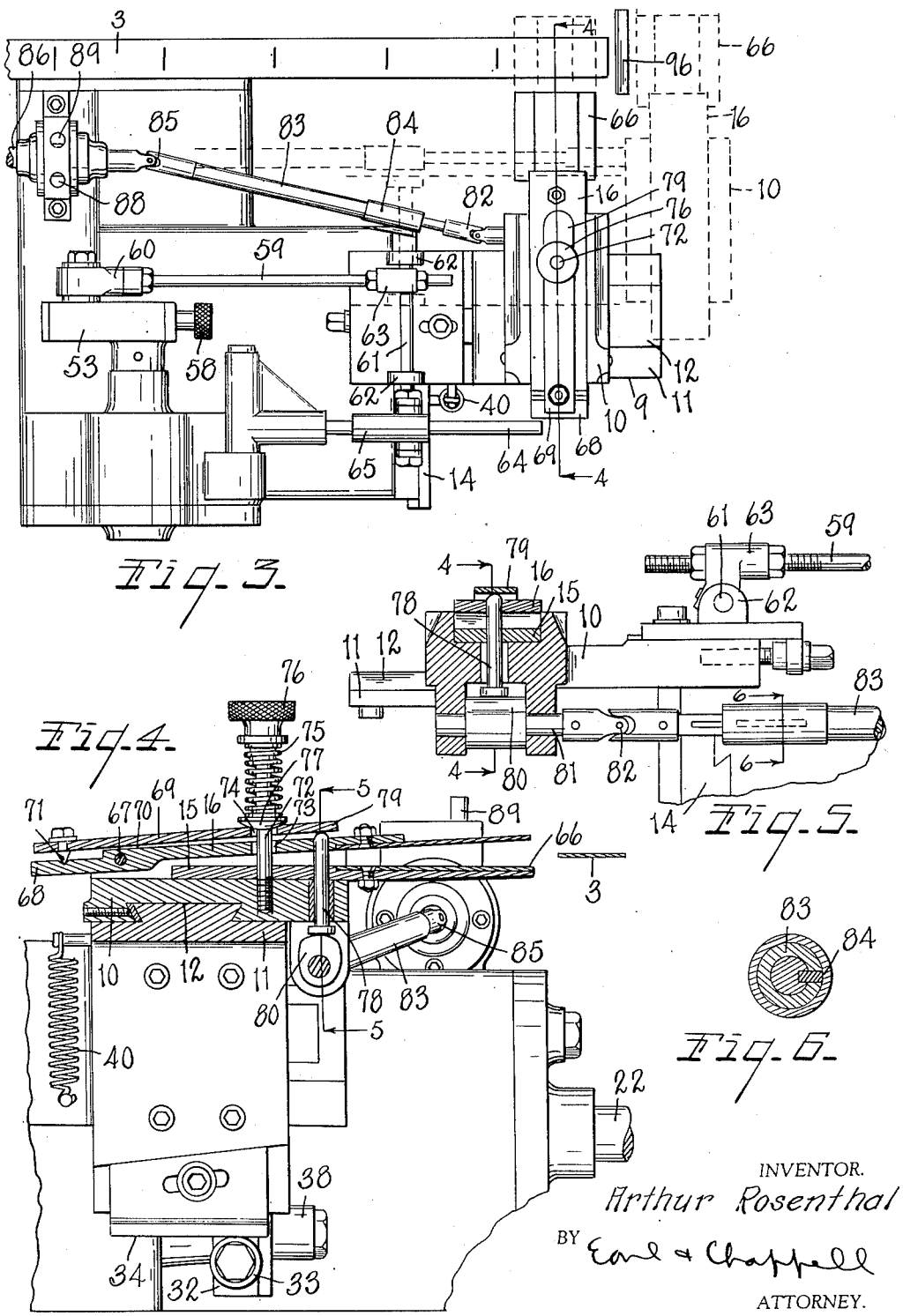

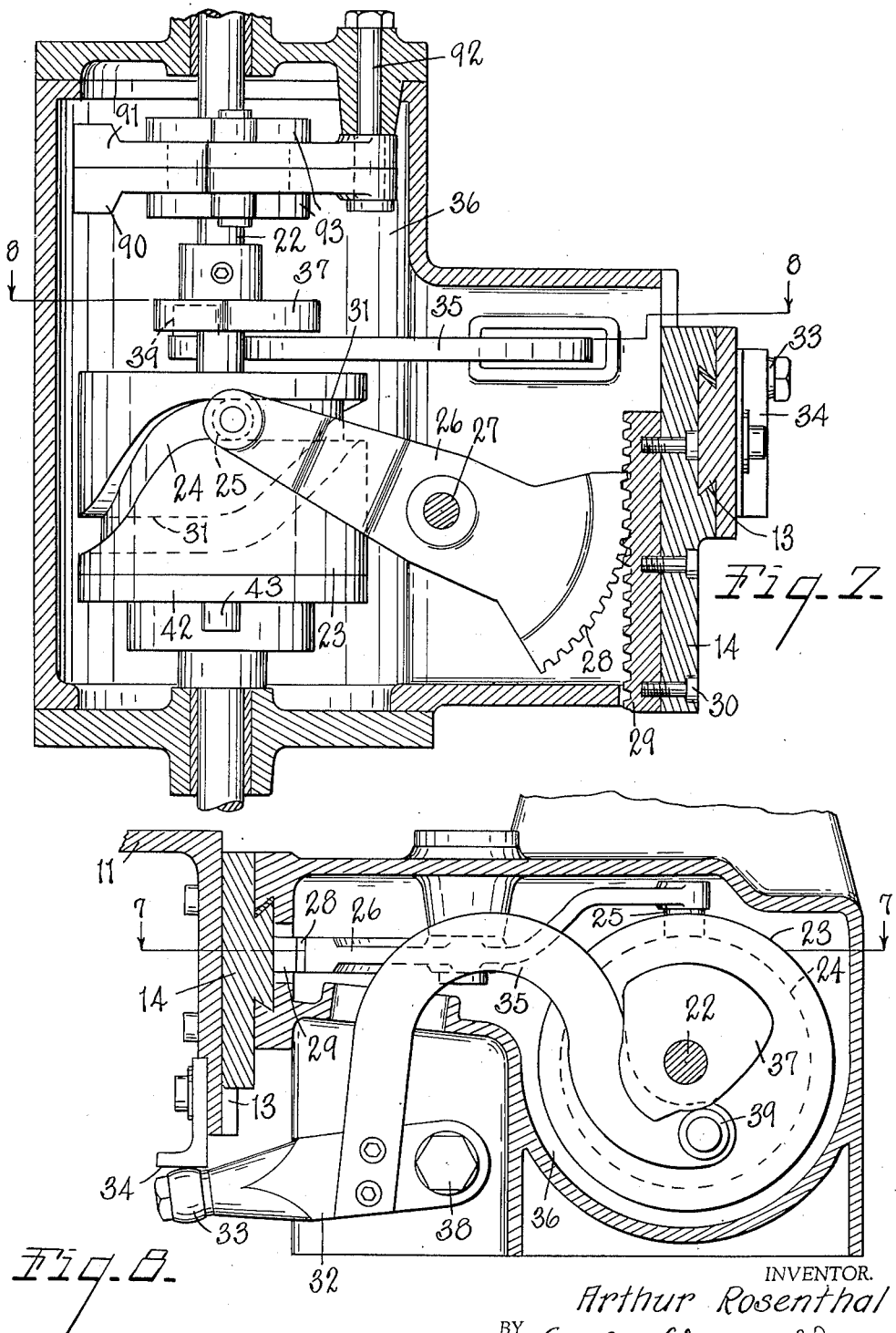

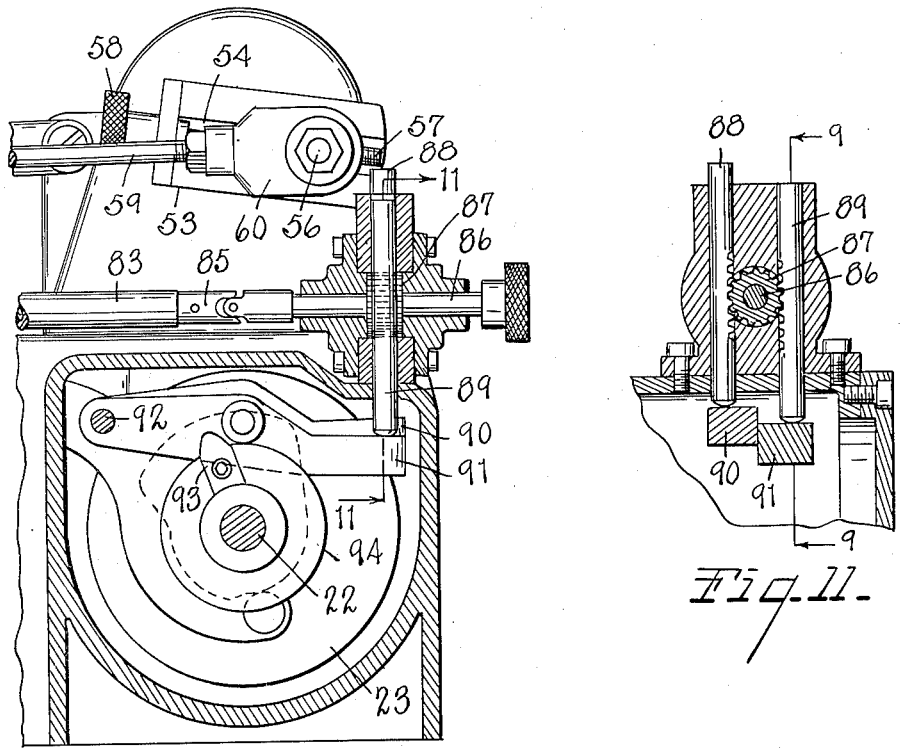
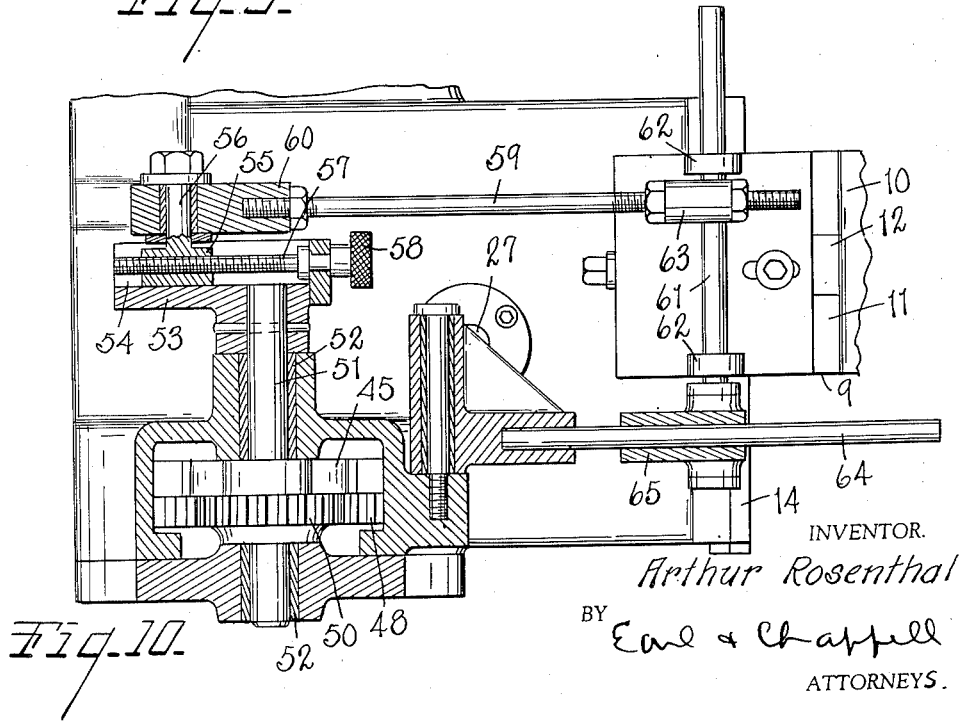

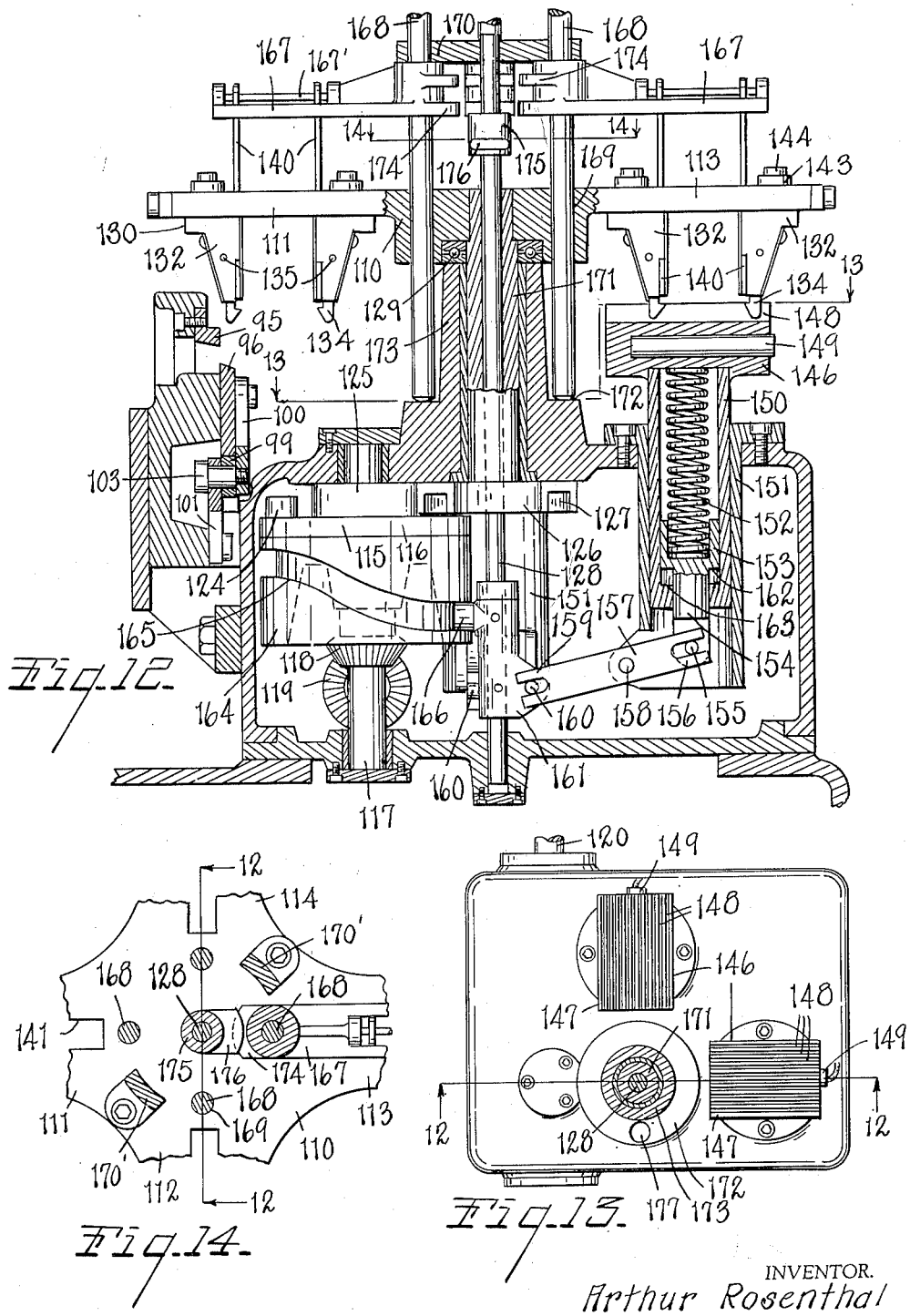

Jan. 17, 1939.  A. ROSENTHAL  2,144,084
LABEL CUTTING AND FOLDING MACHINE
Filed June 1, 1937  9 Sheets-Sheet 7
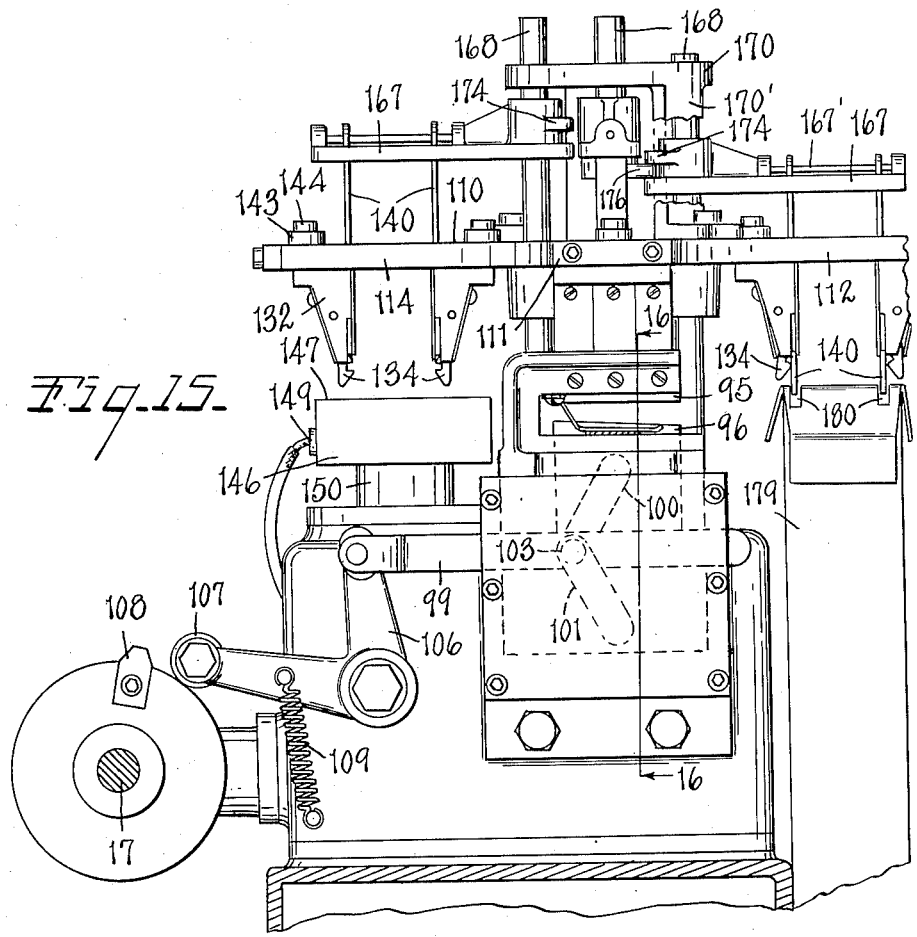
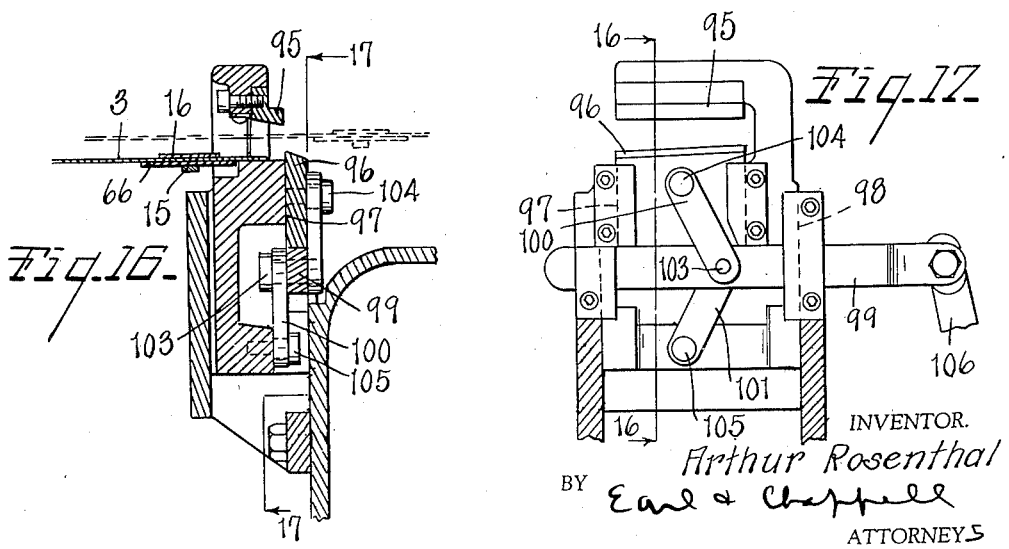
INVENTOR.
Arthur Rosenthal
BY Earl & Chappell
ATTORNEYS Jan. 17, 1939.　　　A. ROSENTHAL　　　2,144,084
LABEL CUTTING AND FOLDING MACHINE
Filed June 1, 1937　　　9 Sheets-Sheet 8
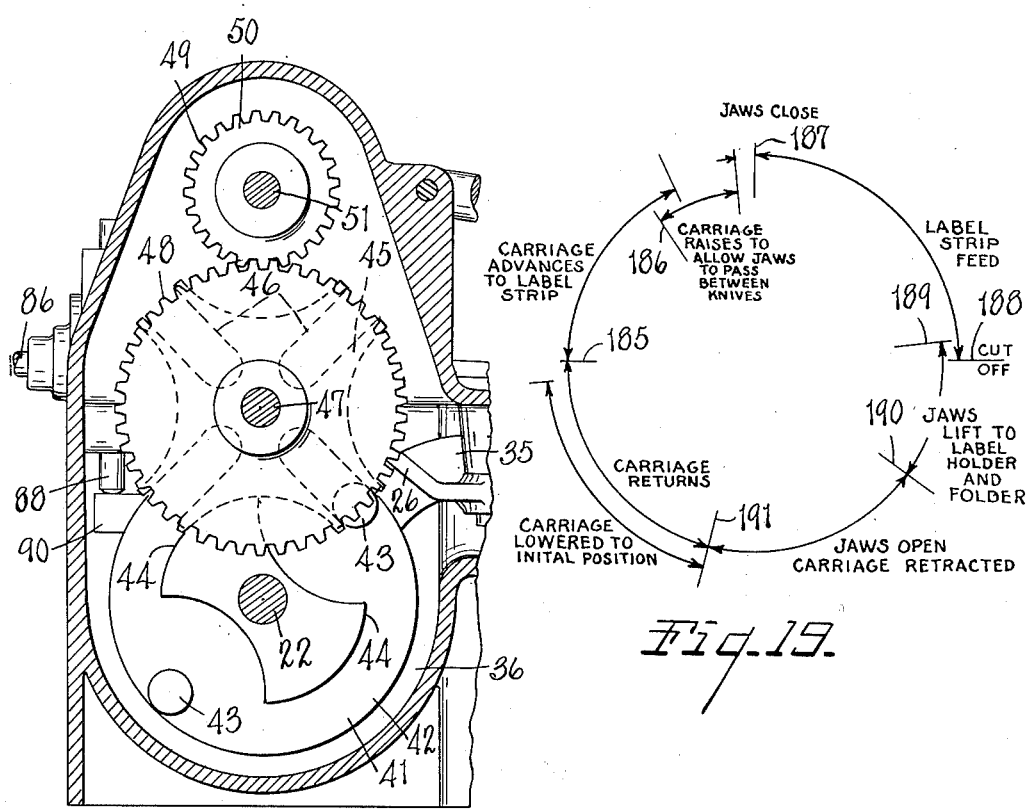
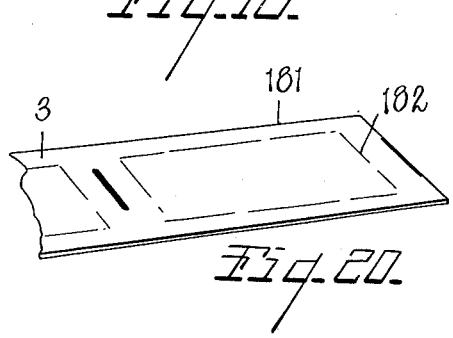
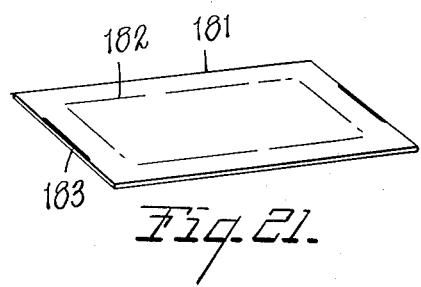
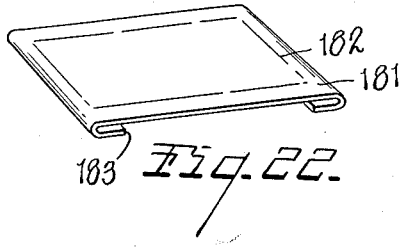
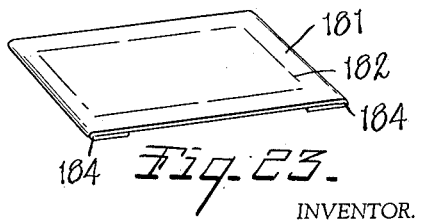
INVENTOR.
Arthur Rosenthal
BY Earl & Chappell
ATTORNEYS

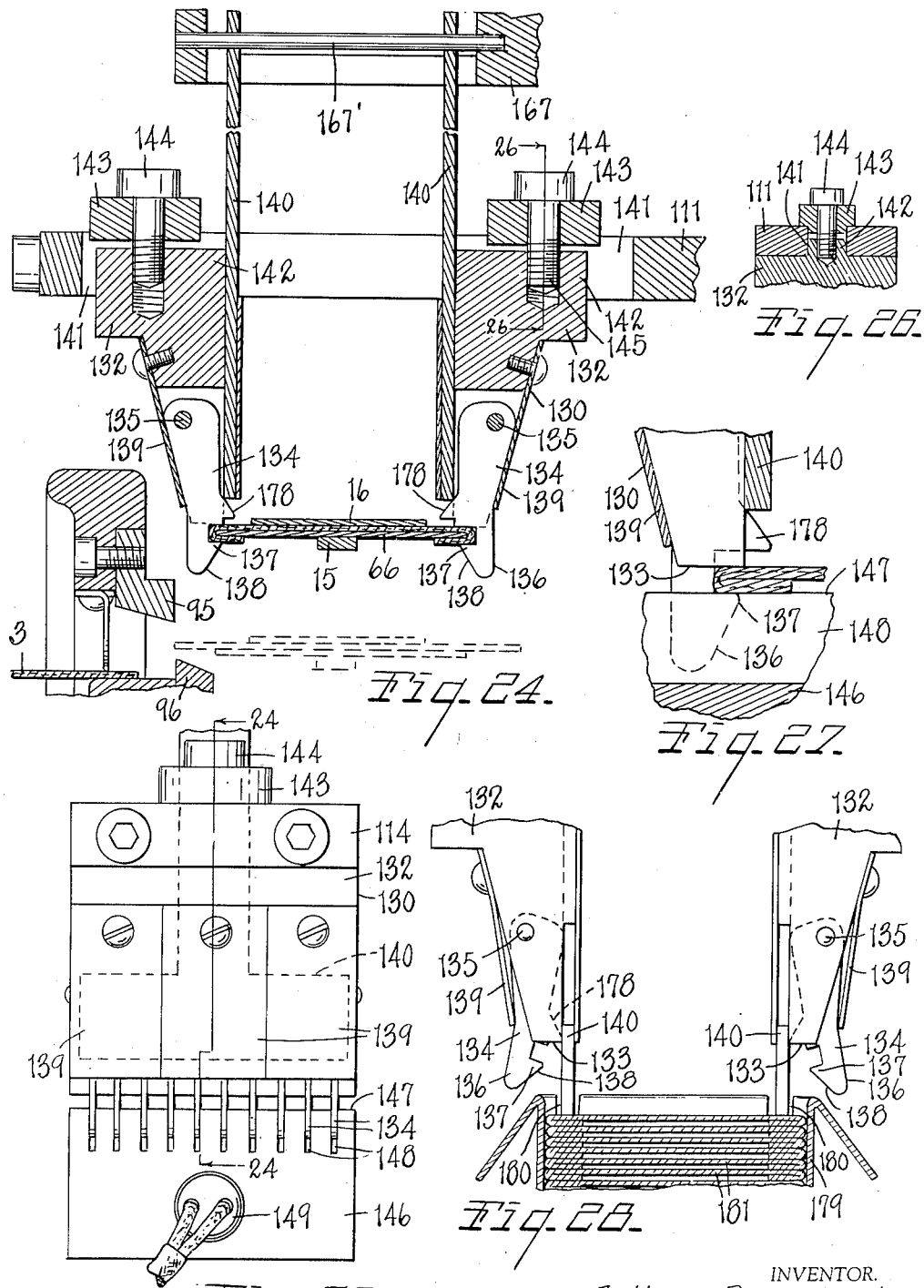

Patented Jan. 17, 1939

2,144,084

UNITED STATES PATENT OFFICE 2,144,084

LABEL CUTTING AND FOLDING MACHINE

Arthur Rosenthal, Grand Rapids, Mich., assignor to Rose Patch & Label Company, Grand Rapids, Mich.

Application June 1, 1937, Serial No. 145,695

38 Claims. (Cl. 270—61)

This invention relates to apparatus for cutting and folding labels. Such labels are ordinarily woven or printed in strips and an individual label is severed from the end of the strip and the cut ends of the label are folded back to conceal the raw edges and to properly position the label insignia on the face of the label and to make the label of the desired length regardless of differences in length which might be caused by the stretch of the material caused either by the weaving or some other factor. In cutting and folding such labels it is desirable to have the individual labels properly positioned during the feeding operation and to have the labels kept under control of the machine until the whole operation of folding and pressing the folded ends is completed so that the finished label will have the insignia properly centered thereon and will have the ends folded evenly and squarely and the proper length of the label maintained. It is desirable also to be able to keep track of the labels as they are fed to the machine so as to permit an operator to remove damaged or improperly woven or printed labels prior to the packing.

The objects of this invention are:

First, to produce a label cutting and folding machine that will accurately position the labels and will cut and fold them, maintaining the accurate positioning of the label with the parts of the machine, and accomplishing the label cutting and folding at a high rate of speed without appreciable noise.

Second, to produce such a machine in which the label as it is cut and folded is held positively and accurately and in which the coacting parts are held positively and accurately to accomplish this result.

Third, to provide such a machine in which the movements of parts are controlled to a great measure by positive positioning means which lock and hold the parts in position during the operations of the machine on the label and which quickly and effectively release the parts from this relationship for the next operation and the next label.

Fourth, to produce such a machine which is easily and quickly adjusted to various sizes of labels so that operation of the machine will not be interrupted during changing from one label length or one label width to another and in which a minimum number of parts are need for making the changes.

Fifth, to provide such a machine in which the label strip is fed with the labels face up so that an operator can note imperfections in the labels and can remove the labels during the operation of the machine so that they will not be packed with the output of the machine.

Sixth, to provide new and improved feeding jaws for such a machine which will open positively to release a label under very slight pressure on the jaws and will close positively and firmly to grip the label.

Further objects and advantages pertaining to details and economies of construction and operation will appear from the detailed description to follow. A preferred embodiment of my machine is illustrated in the accompanying drawings, in which:

Fig. 2 is a side elevation of such a machine viewed from the right of Fig. 1.

Fig. 3 is a detail of the label feeding jaws showing them in a different position from that of Fig. 1, indicating in dotted lines the various positions taken by the jaws, and shown in a plan view.

Fig. 4 is a detail sectional view taken on line 4—4 of Figs. 1, 3 and 5, showing the details of the operating means for the label feeding jaws.

Fig. 5 is a detail sectional view taken on line 5—5 of Fig. 4, showing a detail of the operating plunger for the feed jaws.

Fig. 6 is a detail sectional view taken on line 6—6 of Fig. 5.

Fig. 7 is a detail plan view in section taken on the line 7—7 of Fig. 8, showing the mechanism for operating the feeding carriage for the feed jaws.

Fig. 8 is a detail sectional view taken on line 8—8 of Fig. 7 showing further details of the mechanism for operating the carriage for the feeding jaws.

Fig. 9 is a detail sectional view taken on line 9—9 of Fig. 11, showing the details of the mechanism for operating the feeding jaws in grasping and releasing the label.

Fig. 10 is a detail sectional view in plan showing the means for controlling the operation of the feeding jaw for feeding the label strip to the cutting knives.

Fig. 11 is a detail sectional view on line 11—11 of Fig. 9 showing details of the jaw opening and closing mechanism.

Fig. 12 is a detail sectional view on line 12—12 of Figs. 1, 13 and 14 showing the operating mechanism for the knife and the presser and ejector means shown in plan at the top of Fig. 1.

Fig. 13 is a plan view taken on line 13—13 of Fig. 12 showing a top plan view of the presser mechanisms and the casing therefor.

Fig. 14 is a detail sectional view taken on line 14—14 of Fig. 12, showing the ejector operating mechanism in detail.

Fig. 15 is a detail view partly in section showing the means for operating the knife and showing the packer tube in place to receive the cut and folded labels.

Fig. 16 is a detail sectional view through the knife taken on line 16—16 of Figs. 15 and 17.

Fig. 17 is a detail sectional view showing the knife operating mechanism taken on line 17—17 of Fig. 16.

Fig. 18 is a detail sectional view taken on line 18—18 of Fig. 1, showing the mechanism for controlling and operating the feed of the feeding jaws to and from the folded mechanism.

Fig. 19 is a diagrammatic view showing the timing of the operations.

Fig. 20 is a view of an end of a label strip from which the label is cut.

Fig. 21 is a view of the severed individual label.

Fig. 22 is a view of the label with the ends folded.

Fig. 23 is a view of the label with the ends pressed.

Fig. 24 is a detail sectional view on the line 24—24 of Fig. 25, showing the details of the label folding and holding means.

Fig. 25 is a view showing the presser member in engagement with the holding and folding means for the label.

Fig. 26 is a detail sectional view taken on line 26—26 of Fig. 24, showing the details of the adjustment for the folding means.

Fig. 27 is a detail sectional view showing the presser member pressing the folded end of the label.

Fig. 28 is a detail sectional view showing the packer mechanism forcing the labels into the packer tube.

Figure 1:
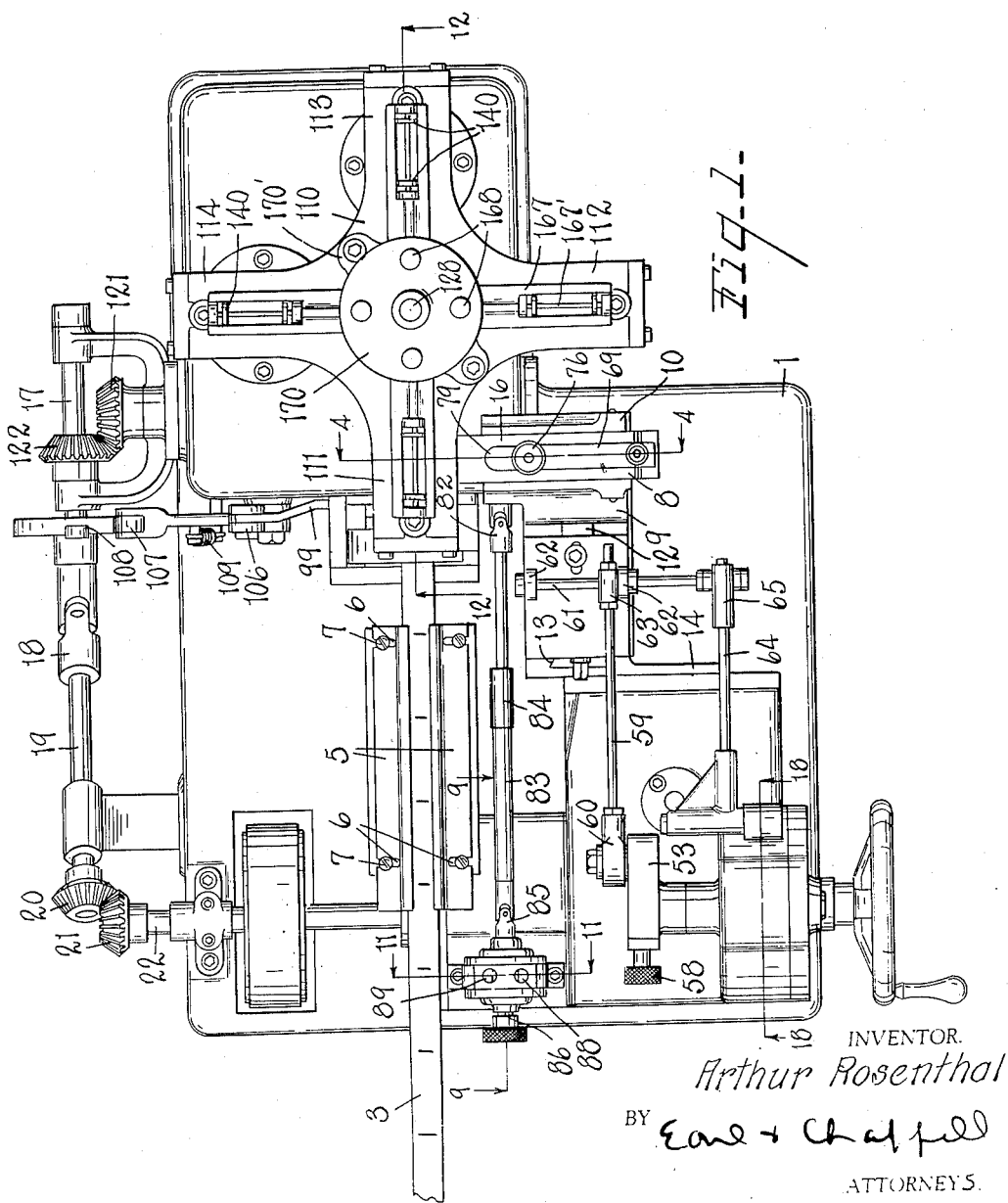
Fig. 1 is a top plan view of a machine embodying my invention.

My improved machine consists of a base 1 supported by suitable legs 2. A strip of labels 3 is supplied from a source 4 and the labels are fed to the machine with the insignia or faces of the labels directed upwardly so that they may be watched by an operator. Guide members 5, suitably slotted at 6 and held by screws 7, are provided for guiding the label and these members are suitably adjustable to receive different widths of labels.

Before severing a label strip, the strip is balanced by means of any suitable balancing device. I prefer to use a device such as is illustrated in my Patent No. 1,984,657, issued December 18, 1934, for Label cutting and folding machine.

The feeding of the label strip is accomplished by a feeding member 8 consisting of a carriage shown generally at 9. This carriage consists of three coacting slides. A horizontally movable slide 10 is movable to advance the label strip and is hereinafter referred to as the feeding slide. The feeding slide 10 is mounted on a vertically movable slide 11 which will be referred to as the elevating slide and suitable ways 12 are provided for the movement of the slide 10 on the slide 11. The elevating slide 11 is mounted in suitable ways 13 on a slide 14 which moves to advance the feeding jaws to the label strip and to retract therefrom and will be referred to as the advancing and retracting slide.

The feeding jaws designated as 15 and 16 are mounted on the series of coacting slides so that they can be moved from the full line position shown in Fig. 3 to the dotted line position directly above the full line position by the movement of the advancing and retracting slide 14. The jaws are then moved to the dotted line position shown at the right of the upper part of Fig. 3 by the feeding slide 10 and are then retracted to a point below the dotted line position at the upper right hand end of Fig. 3, by the advancing and retracting slide 14, and are returned to the full line position of Fig. 3 by the movement of the feeding slide. When the jaws are in the position indicated by dotted lines at the upper right hand corner of Fig. 3, they are elevated by the elevating slide 11 for purposes which will be set forth hereinafter.

The carriage and the various slides are driven by a drive shaft 22 having beveled gears 20 and 21, a connecting shaft 19, a universal joint 18 and driven shaft 17. On the drive shaft 22 is mounted a drum cam 23 having a groove 24 in which a cam follower roller 25 rides. The cam follower roller is mounted on a lever 26 which is pivoted at 27 and has gear teeth 28 at its other end engaging a rack 29 which is fastened to the advancing and retracting slide 14 by suitable machine screws 30.

In Fig. 7 I show the advancing and retracting slide in the retracted position and the cam groove is so formed that between the advancing movement and the retracting movement and between the retracting and advancing movement there are dwells indicated at 31 for holding the jaws in either advanced or retracted position for most of the operation of the machine. The elevating slide 11 is operated by a lever 32 having an antifriction roller 33 engaging the bottom 34 of the elevating slide 11. A curved portion 35 of the lever extends upwardly and over into a well 36 in which the cam 23 and a cam 37 operate. This well is provided so that the cams may operate in oil. The lever 32 is pivoted at 38 and has a cam roller follower 39 engaging the cam 37 which is formed to raise and lower the elevating slide 11 through the operation of the lever 32. A spring 40 is provided to urge the slide 11 downwardly at all times against the movement of the cam 37.

The feeding slide is operated by means of a Geneva movement shown in Fig. 18. The Geneva movement 41 has its disk 42 bearing the pins 43 and the segmental members 44 mounted on the shaft 22. The other disk 45 of the Geneva movement having the slots 46 is mounted on a shaft 47 and has gear teeth 48 at its periphery engaging the gear teeth 49 on a pinion 50 mounted on a shaft 51. The shaft 51 is mounted in suitable bearings 52 and has a crank 53 at the end thereof. The crank 53 is provided with a slideway 54 carrying a slide 55 with a pin 56 which is adjustable by means of a screw 57 to control the throw of the crank to thereby control the throw of the feeding jaws which may be adjusted to conform to the length of the label to be fed simply and easily by turning the knurled end 58 of the screw 57. A pitman 59 having a bearing 60 on the pin 56 is connected to the feeding slide 10 by means of a rockshaft 61 mounted in suitable ears 62 on the slide 10 and having a rocking connection 63 with the pitman. A guide 64 for the feeding slide is provided and the member 65 mounted on the rockshaft 61 serves to guide the slide 10 which may slide longitudinally of the rockshaft 61 during the advancing and retracting movement of the jaws.

The jaws mounted on the slide 10 consist of a fixed jaw 15 and a pivoted jaw 16. The fixed jaw carries on it a fold form 66 over which the ends of the severed labels are folded, as indicated particularly in Fig. 24. The pivoted jaw 16 is pivoted to the fixed jaw 15 by a main pivot 67 and the rear end 68 of the pivoted jaw extends beyond the pivot. A lever member 69 rests on the outer face 70 of the pivoted jaw 16 and has at 71 a pivot bearing on the rear end of the pivoted jaw 16. A rod 72 extends from the fixed jaw 15 through an aperture 73 in the pivoted jaw and an aperture 74 in the lever member 69, these apertures being located between the main pivot 67 and the label gripping ends of the jaws. A compression spring 75 surrounds the rod 72 and is held in place by a knurled nut 76. The spring has at 77 a fulcrum bearing on the lever member 69 and tends to force the lever member 69 against the upper face of the pivoted jaw 16 so as to hold the jaws in closed relationship.

To open the jaws I provide a plunger 78 extending through the fixed jaw and the pivoted jaw and engaging the end 79 of the lever member between the rod 72 and the gripping ends of the jaws. By forcing the plunger 78 upwardly, as indicated in Fig. 4, the ends 79 of the lever member 69 is raised and it fulcrums about the point 71 on the rear end 68 of the jaw 16. This tends to compress the spring 75 and the lever member 69 also fulcrums around the bearing 77 to exert a slight pressure on the end 68 of the jaw 16, tending to force the jaw upwardly. A cam 80 controls the movement of this plunger 78. In the position shown in Fig. 4, the cam is urging the jaws to open position and in a position ninety degrees from the position shown the cam permits the spring 75 to close the jaws. It will be appreciated that the spring 75 can exert considerable force to hold the jaws 15 and 16 together and that when the plunger 78 is in the position shown in Fig. 4, there is a slight force positively opening the jaws 15 and 16, but the force, due to the leverage of the lever member 69 and the jaw 16, is not very great at the gripping end of the jaw 16, so that there is practically no interference from the jaw opening positively as is most desirable when retracting the fold form from the label after the label has been folded and is held by the folder, as will be described later.

The cam 80 is operated through a shaft 81 provided with a universal joint 82 and a telescoping rod 83 having the keyed telescoping member 84 and the universal joint 85 connected to the shaft 86 (see Fig. 11) which is provided with a pinion 87 and rack plungers 88 and 89. By alternately raising and retracting the rack plungers 88 and 89, the cam 80 is made to turn to release the plunger 78 and operation of the jaws is controlled in this way. Tappets 90 and 91 pivoted at 92 control the operation of the plungers 88 and 89. These tappets are controlled by cams 93 mounted on the shaft 22, and as the jaws move to and from the label strip with the movement of the advancing and retracting slide 14, the telescoping shaft and the universal joints maintain the drive to open and close the feed jaws. The jaws remain open or closed, depending upon the position of the plungers 88 and 89, and the cam 80, which has a dwell at 94, holds the jaws in desired position.

In the operation of the device, the jaws 15 and 16 advance to the label strip through the operation of the slide 14 and the jaws are then permitted to close on the label strip which is advanced one label length by the Geneva movement 41 and through the feeding jaws. The cam 37 is provided with a portion for slightly raising the jaws as they pass through the knife and when the jaws have passed through the knife, the dwell of the Geneva movement 41 operating the feeding slide 10 holds the jaws positively and accurately in fixed position with the label length held therebetween. The knife is then operated to sever a label strip. The knife consists of an upper blade 95 and a lower blade 96 disposed in shearing relationship. The blade 96 is movable up and down in the slideways 97 and the blade 95 is movable up and down in the slideways 98. A bar 99 movable horizontally as viewed in Figs. 15, 16 and 17 actuates the blades by means of toggle levers 100 and 101. The bar 99 slides in ways 102 and the toggle arms 100 and 101 are pivoted thereto at 103. The toggle arm 100 is pivoted to the blade 96 at the point 104, and the toggle arm 101 is pivoted to the blade 95 at the point 105. Movement of the bar 99 to the left tends to raise the knife 96 and lower the knife 95 to sever a label from the end of the strip. A bell crank lever 106 actuates the sliding bar 99 through a cam follower roller 107 engaged by a cam 108 mounted on the drive shaft 17. A spring 109 retracts the bar 99 to open the knives after the cam 108 has operated and holds the cam follower 107 on the surface of the cam 108.

Located adjacent the knife is a turret 110. The turret 110 is provided with four arms 111, 112, 113 and 114 and has indexing means for moving the turret one-quarter turn during the feeding and severing of a label from the end of the strip. This indexing means consists of a Geneva movement 115 (see Fig. 12) consisting of a disk 116 mounted on a shaft 117 having beveled gear 118 meshing with beveled gear 119 on shaft 120 which is connected to the drive shaft by beveled gear 121 and geveled gear 122 on the drive shaft 17. The disk 116 has a pin 124 and a segment 125 and the cooperating disk 126 of the Geneva movement is provided with the slots 127. The disk 126 is connected to drive the turret through a sleeve 171 through which a shaft 128 is movable. A bearing 129 supports the turret. The Geneva movement is so arranged that at one of the indexing positions, one of the arms 111, 112, 113 or 114 is positioned directly adjacent the knife 95 and slightly above it and the dwell of the Geneva movement is arranged to operate at that point to hold the arm in fixed accurate position.

A plurality of folders 130 are provided, one mounted on each arm of the turret and these folders are positioned directly above the jaw held by the dwell of the Geneva movement which operates the feed slide after the label has been severed. These folders 130 are adjustable to accommodate different lengths of labels and each folder consists of a pair of members 132 adjustable to and away from one another along the length of the folder. The folder is considered as lying lengthwise of the radial arm of the turret. At the bottom of each member 132 is provided a bearing face 133 to receive the end of the fold form 66 with a label thereon. Each of the members 132 is provided with a series of thin slots extending longitudinally of the folder and spaced longitudinally from one another. A folder finger 134 is pivoted in each of these slots at 135 and the free end 136 of the folder finger extends beyond the bearing face 133, as shown in Fig. 24.

The folder fingers are preferably pieces of sheet metal and are pivoted to move edgewise along the length of the folder and each is provided with a detent 137 spaced from the bearing face 133 to form a recess into which the end of the fold form with a label thereon will fit. The inner edges of the fold fingers 134 are beveled at 138 so that as the fold form is moved up from dotted line position as shown in Fig. 24 to the full line position, the ends of the fold form will spread the fingers apart and they will then fold the end of the label over the end of the fold form as shown and will snap into place as indicated in the full lines in Fig. 24. Spring plates 139 are provided to normally urge the fingers 134 toward the transverse center line of the folder and the feeder plunger 140 serves as a stop to hold the fingers in transverse alinement after they have performed the folding operation.

For different lengths of labels different lengths of fold forms 66 must be provided. These may be easily placed on the jaw and to adjust the folder for different lengths the members 132 are moved longitudinally of the radial arms of the turret. The members 132 are provided with ribs 141 at their upper edge riding in slots 142 in the arms 111, 112, 113 or 114 and a washer 143 riding over the top of the slot is provided for holding a headed screw 144 which is in screw-threaded engagement at 145 with the member 132. By loosening the screws, it is possible to adjust the members 132 to or away from one another.

The operation of the folding over the end of the label is accomplished when the feeding slide Geneva movement is dwelling and holding the feeding jaws directly under the downwardly facing folder 130. At this time the cam 37 operates the elevating slide 11 which moves the jaws 15 and 16 with the fold form 66 to the full line position shown in Fig. 24, the folder being held by the dwell of the Geneva movement which indexes the turret. After the fingers 134 have snapped into place, the operation of the advancing and retracting slide 14 withdraws the jaws and the fold form after the jaws have been released by the operation of the jaw release mechanism heretofore described and the fold form and jaws are retracted leaving the label held in the folders in a manner indicated in Fig. 27, the detents 137 of the fingers 134 holding the fold of the label against the bearing face 133. By using a plurality of thin fingers it is possible to have the label firmly held against any tendency to withdrawal by removal of the fold form, which has been one of the difficulties of the prior art label cutting and folding machines, and it is possible to thus hold the label accurately positioned and folded for the next operation.

After the jaws have been removed from the folder 130, the turret is indexed and the folder which was held above the jaws to receive the label is moved to a label pressing position which is the position of the arm 114 in Fig. 1. The Geneva movement then causes a dwell and a presser member presses the crease at the fold of the label. This presser member consists of a heated plate 146 which has a bearing face 147 provided with a plurality of grooves 148 spaced apart and of a depth to and positioned to receive the projecting ends 136 of the fold fingers 134 to permit the face 147 of the presser member to press the fold in the label at the points between the fingers 134, as shown in Fig. 27. The presser 146 is provided with an electric heater 149 and is mounted on a vertically movable column 150. There are two such presser members provided and both may be used as desired, or if one will do the pressing satisfactorily, only one need be employed. They are substantially identical and description of one will serve for both. Both have the column 150 sliding in a suitable vertical way 151. The column is hollow and is provided with a compression spring 152 bearing against a slidable member 153 on the inside of the column and against the base of the member 146. The member 153 has a projecting stem 154 provided with a pin 155 engaged by a fork 156 on the lever 157 which is pivoted at 158 and is provided with a fork 159 at its other end to engage a pin 160 on member 161 fixed on shaft 128. Movement of the member 153 upwardly exerts spring pressure against the presser 146 urging it yieldingly against the bearing face 133 of the folder positioned thereabove and a downward movement of the member 153 retracts the column 150 and the presser through engagement of the shoulder 162 on member 153 with the shoulder 163 on the column. Movement of the lever 157 is accomplished through a cam 164 provided with a groove 165 which cam is attached to the shaft 117. The member 161 is provided with a cam follower roller 166 which causes the shaft 128 to move up and down as is best seen in Fig. 12.

When the folder is indexed to the position of arm 112 in Fig. 1, the label is ejected. This is accomplished by means of the ejector members 140 which are provided for each folder 130. These members 140 slide down between the members 132 and are actuated by the arms 167 fastened to rods 168 which pass through the openings 169 in the turret and are guided by a member 170 which is fixedly secured to turret 110 by brackets 170'. The ends of these rods ride on the shoulder 172 of the support 173 for the turret and are not actuated except at the label expelling station occupied by the arm 112 in Fig. 1. Each arm 167 has an inwardly facing fork 174 and a member 175 mounted on the reciprocating shaft 128 and has a fin 176 extending along the direction of arm 112 in Fig. 1. When one of the arms is at that position, the fin 176 engages in the fork 174 and the rod 168 is positioned above the hole 177 so that a downward movement of the rod or shaft 128 brought about by the cam 164 will move the ejector members 140 downwardly. Members 140 are slidably mounted on rods 167' to permit adjustment along the slotted arms 167. In their downward movement they engage cams 178 on the inner edges of the fingers 134 retracting the fingers to the position shown in Fig. 28 and the packer engages the label and forces it down into a packer tube 179 which has its upper edges slotted at 180 to permit the label to be forced down into the tube.

In Figs. 20–23, I show the label 181 on the end of the label strip 3. In Fig. 21, I show the label 181 with its insignia 182 and severed ends 183. These ends are then bent over as shown in Fig. 22 and are creased as shown in Fig. 23 at 184, making the finished label which is forced down into the packer tube as shown.

In Fig. 19, I show diagrammatically the timing of the various cams and Geneva movements. The cams and Geneva movements are timed together to accomplish the desired result. Fig. 19 shows diagrammatically the timing of the operation of the jaws. Starting at point 185, the jaws and the carriage supporting them advance to the label strip to grasp the same. This movement takes up the time indicated in the drawings. Just before the carriage and jaws have advanced to the full extent of the advancing movement, the carriage raises slightly to engage the fold form with the under side of the label strip and to provide clearance as the jaws pass through the knife. The start of this movement which is accomplished through the action of cam 37 through the various levers to the elevating slide 11 is indicated at 186 (Fig. 19). The closing of the jaws is indicated at point 187 and the label strip is then fed through the operation of the feeding slide 10 and its Geneva movement 41. When the jaws have passed through to the end of the feeding movement which is indicated at 188, the Geneva movement 41 causes a dwell of the feeding slide 10. The cut-off knife is actuated at this point. The jaws start to lift to the label folder or holder at the point 189 which is slightly in advance of the cut-off. While the slide 10 and the jaws are dwelling, the turret has moved one of the label folders or holders 130 to a position directly above the jaws and a dwell in the Geneva movement actuating the turret holds the folder or holder 130 in this position. The jaws are then lifted to the holder starting at the point 189 and ending at the point 190 which is accomplished through a further raising of the elevating slide 11. At the point 190, the jaws open and are retracted through the movement of the slide 14. The paws then start and return to initial position. This is indicated at the point 191. The return of the carriage is accomplished through the Geneva movement 41 and the feeding slide 10 and at the same time the jaws are lowered to their initial position through the downward movement of the elevating slide 11. While this movement is taking place, the Geneva movement which actuates the turret is indexing the turret with its attached folders to the next position. The folder carrying the label is then positioned above the presser 146. While the jaws are being raised to the folders (see points 189—190, Fig. 19) and are being opened and the carriage retracted (see 190—191, Fig. 19), the cam 164 operating lever 157 raises the presser member to press labels held in the folders at the positions of the arms 114 and 113 of Fig. 1. At the same time the downward movement of shaft 128 serves to move the ejectors 140 downwardly to move back the fingers 134 to pack the label in the tube in the position of arm 112 (see Fig. 1).

It will be appreciated that for different size labels it is only necessary to replace one part, namely, the fold form 66. The width of the label is not material because the bearing faces 133 and the fingers 134 are arranged along a transverse line sufficiently wide to accommodate any label, and the adjusted folders may be adjusted to accommodate any length of label. The throw of the Geneva movement 41 may be adjusted through the screw 57 to feed the label strip one label length and the operation of the machine need be stopped for only a short time to accomplish this, whereas in the prior art machines it has been necessary to change folders, heaters and fold forms and to adjust the throw of the feeding arms through various complicated mechanisms. In using the particular folder, there is no tendency for the label to be pulled out with the fold form, because the plurality of thin fingers hold the label securely in position. By using Geneva movements to control the feeding of the label and the indexing, it is possible to provide positive accurate positioning of the parts and the label is positively and accurately positioned for each operation.

Having thus described my invention, what I claim as new and desire to secure by Letters Patent is:

1. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising an advancing and retracting slide to advance the jaws to the label strip and to retract them from the severed label, a feeding slide movable horizontally to move the jaws in label feeding direction and to return them, and an elevating slide to elevate the jaws to a folder and to lower them, cams for operating said advancing and retracting slide and said elevating slide, a Geneva movement for operating said feeding slide and means for controlling the movements of the other slides, a fold form on the lower jaw over the ends of which the severed ends of the individual label are folded, a plurality of label folders each comprising a pair of members adjustable longitudinally of said label folders to and away from one another and having bearing faces extending transversely of said label folder, each bearing face adapted to receive an end of a label fold form and a label, each member having a plurality of spaced flat folding fingers each finger being movable edgewise longitudinally of said folder and urged by spring means toward the transverse center line of said label folder and against a transverse stop, each of said fingers projecting from one of the bearing faces and having a detent at the inner edge and spaced from said bearing face to fit over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder member to permit the face of the presser to press the fold of the label against the bearing faces at the points between the fingers, a cam to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, a second Geneva movement for operating said turret with the dwell of said movement positioning and holding each folder successively at each position, said cams and actuating means and Geneva movements having driving means and being so timed that the dwell of the first Geneva movement operating the feeding slide and the dwell of the second Geneva movement coincide to permit the accurately fed and positioned label to be moved upwardly into the folder at the folding position of the turret by the elevating slide cam and the advancing and retracting cam to retract the feed jaws from the label during the dwell and to permit the presser to press the label in the folder at the pressing position of the turret during the dwell and to permit the ejection and packing of the label from the folder at the ejecting position of the turret at the same time.

2. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising an advancing and retracting slide to advance the jaws to the label strip and to retract them from the severed label, a feeding slide movable horizontally to move the jaws in label feeding direction and to return them, and an elevating slide to elevate the jaws to a folder and to lower them, cams for operating said advancing and retracting slide and said elevating slide, a Geneva movement for operating said feeding slide, and means for controlling the movements of the other slides, a fold form on the lower jaw over the ends of which the severed ends of the individual label are folded, a plurality of label folders each comprising a pair of members adjustable longitudinally of said label folders to and away from one another and having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, a cam to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, a second Geneva movement for operating said turret with the dwell of said movement positioning and holding each folder successively at each position, said cams and actuating means and Geneva movements having driving means and being so timed that the dwell of the first Geneva movement operating the feeding slide and the dwell of the second Geneva movement coincide to permit the accurately fed and positioned label to be moved upwardly into the folder at the folding position of the turret by the elevating slide cam and the advancing and retracting cam to retract the feed jaws from the label during the dwell and to permit the presser to press the label in the folder at the pressing position of the turret during the dwell and to permit the ejection and packing of the label from the folder at the ejecting position of the turret at the same time.

3. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising an advancing and retracting slide to advance the jaws to the label strip and to retract them from the severed label, a feeding slide movable horizontally to move the jaws in label feeding direction and to return them, and an elevating slide to elevate the jaws to a folder and to lower them, cams for operating said advancing and retracting slide and said elevating slide, a Geneva movement for operating said feeding slide, and means for controlling the movements of the other slides, a fold form on the lower jaw over the ends of which the severed ends of the individual label are folded, a plurality of label folders each having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, a cam to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, a second Geneva movement for operating said turret with the dwell of said movement positioning and holding each folder successively at each position, said cams and actuating means and Geneva movements having driving means and being so timed that the dwell of the first Geneva movement operating the feeding slide and the dwell of the second Geneva movement coincide to permit the accurately fed and positioned label to be moved upwardly into the folder at the folding position of the turret by the elevating slide cam and the advancing and retracting cam to retract the feed jaws from the label during the dwell and to permit the presser to press the label in the folder at the pressing position of the turret during the dwell and to permit the ejection and packing of the label from the folder at the ejecting position of the turret at the same time.

4. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising means for advancing the jaws to the label strip and for feeding the strip and for raising the jaws after a label has been severed, a Geneva movement for controlling the label feeding movement of said jaws and means for controlling the movements of the other slides, a fold form on the lower jaw over the ends of which the severed ends of the individual label are folded, a plurality of label folders each comprising a pair of members adjustable longitudinally of said label folders to and away from one another and having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder member to permit the face of the presser to press the fold of the label against the bearing faces at the points between the fingers, means to raise said presser to said folder, a packer means for each folder engageable with a cam on the inner edge of said finger to force the fingers apart to release the label and having an end to force the label from the folder into a packer tube, and actuating means engageable with said packer means when its folder is at the expelling position of the turret, a second Geneva movement for operating said turret with the dwell of said movement positioning and holding each folder successively at each position, said actuating means and Geneva movements having driving means and being so timed that the dwell of the first Geneva movement operating the feeding slide and the dwell of the second Geneva movement coincide to permit the accurately fed and positioned label to be moved upwardly into the folder at the folding position of the turret during the dwell and to permit the presser to press the label in the folder at the pressing position of the turret during the dwell and to permit the ejection and packing of the label from the folder at the ejecting position of the turret at the same time.

5. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising means for advancing the jaws to the label strip and for feeding the strip and for raising the jaws after a label has been severed, a Geneva movement for controlling the label feeding movement of said jaws and means for controlling the movements of the other slides, a fold form on the lower jaw over the ends of which the severed ends of the individual label are folded, a plurality of label folders each having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, means to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, a second Geneva movement for operating said turret with the dwell of said movement positioning and holding each folder successively at each position, said actuating means and Geneva movements having driving means and being so timed that the dwell of the first Geneva movement operating the feeding slide and the dwell of the second Geneva movement coincide to permit the accurately fed and positioned label to be moved upwardly into the folder at the folding position of the turret during the dwell and to permit the presser to press the label in the folder at the pressing position of the turret during the dwell and to permit the ejection and packing of the label from the folder at the ejecting position of the turret at the same time.

6. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising means for advancing the jaws to the label strip and for feeding the strip and for raising the jaws after a label has been severed, and means for controlling movements of the slides, a fold form on the lower jaw over the ends of which the severed ends of the individual label are folded, a plurality of label folders each comprising a pair of members adjustable longitudinally of said label folders to and away from one another and having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, means to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, a Geneva movement for operating said turret with the dwell of said movement positioning and holding each folder successively at each position, said actuating means and Geneva movement having driving means and being so timed that the dwell of the actuating means operating the feeding slide and the dwell of the Geneva movement coincide to permit the fed and positioned label to be moved upwardly into the folder at the folding position of the turret during the dwell and to permit the presser to press the label in the folder at the pressing position of the turret during the dwell and to permit the ejection and packing of the label from the folder at the ejecting position of the turret at the same time.

7. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising means for advancing the jaws to the label strip and for feeding the strip and for raising the jaws after a label has been severed, and means for controlling the movements of the slides, a fold form on the lower jaw over the ends of which the severed ends of the individual label are folded, a plurality of label folders each having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, a pressing position and finally an ejecting position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, means to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, a Geneva movement for operating said turret with the dwell of said movement positioning and holding each folder successively at each position, said actuating means and Geneva movement having driving means and being so timed that the dwell of the actuating means operating the feeding slide and the dwell of the Geneva movement coincide to permit the fed and positioned label to be moved upwardly into the folder at the folding position of the turret during the dwell and to permit the presser to press the label in the folder at the pressing position of the turret during the dwell and to permit the ejection and packing of the label from the folder at the ejecting position of the turret at the same time.

8. In a label cutting and folding machine, the combination of means for supplying a label strip with the labels facing upwardly, a knife to sever individual labels from the end of the strip, means for actuating the knife, feed jaws comprising an upper and a lower jaw to feed the label strip the length of an individual label, a carriage for said jaws comprising means for advancing the jaws to the label strip and for feeding the strip and for raising the jaws after a label has been severed, and means for controlling the movements of the slides, a fold form on the lower jaw over the ends of which the severed ends of the individual label are folded, a plurality of label folders each having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, and a pressing position, with the folder in said pressing position being disposed above the feed jaws after a label has been severed and is held in said feed jaws, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, means to raise said presser to said folder, a Geneva movement for operating said turret with the dwell of said movement positioning and holding each folder successively at each position, said actuating means and Geneva movement having driving means and being so timed that the dwell of the actuating means operating the feeding slide and the dwell of the Geneva movement coincide to permit the fed and positioned label to be moved upwardly into the folder at the folding position of the turret during the dwell and to permit the presser to press the label in the folder at the pressing position of the turret during the dwell.

9. In a label folding machine, the combination of label feeding jaws having a fold form, a Geneva movement to control the feeding movement of said jaws, a label folder comprising a pair of members adjustable longitudinally of said folders to and away from one another to fit the fold form and having bearing faces extending transversely of said label folder, each bearing face adapted to receive an end of a label fold form and a label, each member having a plurality of spaced flat folding fingers each finger being movable edgewise longitudinally of said folder and urged by spring means toward the transverse center line of said label folder and against a transverse stop, each of said fingers projecting from one of the bearing faces and having a detent at the inner edge and spaced from said bearing face to fit over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position, and a pressing position, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, a second Geneva movement for operating said turret with the dwell of said movement positioning and holding the folder successively at each position, and means for causing relative movement between the jaws and the fold form during the dwell of said first Geneva movement and when the fold form is at the folding position, and means for causing relative movement between the presser and the folder at the pressing position, said relative movements being timed to occur during the dwell of said second Geneva movement.

10. In a label folding machine, the combination of label feeding jaws having a fold form, a Geneva movement to control the feeding movement of said jaws, a label folder comprising a pair of members adjustable longitudinally of said folders to and away from one another to fit the fold form and having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position, and a pressing position, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, a second Geneva movement for operating said turret with the dwell of said movement positioning and holding the folder successively at each position, and means for causing relative movement between the jaws and the fold form during the dwell of said first Geneva movement and when the fold form is at the folding position, and means for causing relative movement between the presser and the folder at the pressing position, said relative movements being timed to occur during the dwell of said second Geneva movement.

11. In a label folding machine, the combination of label feeding jaws having a fold form, means to control the feeding movement of said jaws having a dwell at the end of the feeding operation, a label folder comprising a pair of members adjustable longitudinally of said folders to and away from one another to fit the fold form and having bearing faces extending transversely of said label folder, each bearing face adapted to receive an end of a label fold form and a label, each member having a plurality of spaced flat folding fingers each finger being movable edgewise longitudinally of said folder and urged by spring means toward the transverse center line of said label folder and against a transverse stop, each of said fingers projecting from one of the bearing faces and having a detent at the inner edge and spaced from said bearing face to fit over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position, and a pressing position, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, a means for operating said turret and having a dwell positioning and holding the folder successively at each position, and means for causing relative movement between the jaws and the fold form during the dwell of said jaw feeding means and when the fold form is at the folding position, and means for causing relative movement between the presser and the folder at the pressing position, said relative movements being timed to occur during the dwell of said turret operating means.

12. In a label folding machine, the combination of label feeding jaws having a fold form, means to control the feeding movement of said jaws having a dwell at the end of the feeding operation, a label folder comprising a pair of members adjustable longitudinally of said folders to and away from one another to fit the fold form and having bearing faces extending transversely of said label folder, each bearing face adapted to receive an end of a label fold form and a label, each member having a plurality of spaced flat folding fingers each finger being movable edgewise longitudinally of said folder, each of said fingers projecting from one of the bearing faces and having a detent at the inner edge and spaced from said bearing face to fit over a fold form and label, a turret carrying said label folders and adapted to position said folders successively at a folding position and a pressing position, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, a means for operating said turret and having a dwell positioning and holding the folder successively at each position, and means for causing relative movement between the jaws and the fold form during the dwell of said jaw feeding means and when the fold form is at the folding position, and means for causing relative movement between the presser and the folder at the pressing position, said relative movements being timed to occur during the dwell of said turret operating means.

13. In a label folding machine, the combination of label feeding jaws having a fold form, means to control the feeding movement of said jaws having a dwell at the end of the feeding operation, a label folder having bearing faces extending transversely of said label folder, each bearing face adapted to receive an end of a label fold form and a label, each member having a plurality of spaced flat folding fingers each finger being movable edgewise longitudinally of said folder and urged by spring means toward the transverse center line of said label folder and against a transverse stop, each of said fingers projecting from one of the bearing faces and having a detent at the inner edge and spaced from said bearing face to fit over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position and a pressing position, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, a means for operating said turret and having a dwell positioning and holding the folder successively at each position, and means for causing relative movement between the jaws and the fold form during the dwell of said jaw feeding means and when the fold form is at the folding position, and means for causing relative movement between the presser and the folder at the pressing position, said relative movements being timed to occur during the dwell of said turret operating means.

14. In an apparatus of the class described, a label folding and holding means comprising a pair of members adjustable longitudinally of the folder to and away from one another and having bearing faces extending transversely of said label folder, each bearing face adapted to receive an end of a label fold form and a label thereon, each bearing face having a plurality of spaced slots therein extending longitudinally of the folder, each slot having a flat folding finger pivoted therein so as to be movable edgewise in its slot, each finger having an end extending beyond the bearing face and having formed on its inner edge a detent spaced from the bearing face to provide a recess to fit over a fold form or label bearing against the bearing face, the end portion of the inner edge of each finger beyond the detent being beveled to permit a fold form being moved toward the bearing face to engage the bevel to move the folders outwardly before they snap over the fold form to fold the end of a label thereover, and spring means bearing against the outer edges of the fingers urging said fingers toward the center transverse line of the folder, and means for stopping said fingers in transverse alinement in the folder, a presser member having longitudinal slots extending across the face thereof of a depth to and positioned to receive the fingers projecting from the bearing faces to permit the face of the presser to press the fold of the label against the bearing face between the fingers regardless of the adjustment of the folding members, and a packer member between said members, and cams on the inner edges of said fingers to be engaged by said packer member as it moves to expel a label from the folder, whereby the fingers are retracted from a label held by them before the packer member engages the label to expel it.

15. In an apparatus of the class described, a label folding and holding means comprising a pair of members adjustable longitudinally of the folder to and away from one another and having bearing faces extending transversely of said label folder, each bearing face adapted to receive an end of a label fold form and a label thereon, each bearing face having a plurality of spaced slots therein extending longitudinally of the folder, each slot having a flat folding finger pivoted therein so as to be movable edgewise in its slot, each finger having an end extending beyond the bearing face and having formed on its inner edge a detent spaced from the bearing face to provide a recess to fit over a fold form or label bearing against the bearing face, the end portion of the inner edge of each finger beyond the detent being beveled to permit a fold form being moved toward the bearing face to engage the bevel to move the folders outwardly before they snap over the fold form to fold the end of a label thereover, and spring means bearing against the outer edges of the fingers urging said fingers toward the center transverse line of the folder, and means for stopping said fingers in transverse alinement in the folder, and a presser member having longitudinal slots extending across the face thereof of a depth to and positioned to receive the fingers projecting from the bearing faces to permit the face of the presser to press the fold of the label against the bearing face between the fingers regardless of the adjustment of the folding members.

16. In an apparatus of the class described, a label folding and holding means comprising a pair of members adjustable longitudinally of the folder to and away from one another and having bearing faces extending transversely of said label folder, each bearing face adapted to receive an end of a label fold form and a label thereon, a plurality of flat folding fingers movable edgewise longitudinally of the folder, each finger having an end extending beyond the bearing face and having formed on its inner edge a detent spaced from the bearing face to provide a recess to fit over a fold form or label bearing against the bearing face, and a presser member having longitudinal slots extending across the face thereof of a depth to and positioned to receive the fingers projecting from the bearing faces to permit the face of the presser to press the fold of the label against the bearing face between the fingers regardless of the adjustment of the folding members.

17. In an apparatus of the class described, a label folding and holding means having bearing faces extending transversely of said label folder, each bearing face adapted to receive an end of a label fold form and a label thereon, each bearing face having a plurality of spaced slots therein extending longitudinally of the folder, each slot having a flat folding finger pivoted therein so as to be movable edgewise in its slot, each finger having an end extending beyond the bearing face and having formed on its inner edge a detent spaced from the bearing face to provide a recess to fit over a fold form or label bearing against the bearing face, the end portion of the inner edge of each finger beyond the detent being beveled to permit a fold form being moved toward the bearing face to engage the bevel to move the folders outwardly before they snap over the fold form to fold the end of a label thereover, and spring means bearing against the outer edges of the fingers urging said fingers toward the center transverse line of the folder, and means for stopping said fingers in transverse alinement in the folder, and a presser member to press the fold of the label against the bearing face.

18. In an apparatus of the class described, a label folding and holding means having bearing faces extending transversely of said label folder, each bearing face adapted to receive an end of a label fold form and a label thereon, a plurality of flat folding fingers movable edgewise longitudinally of the folder, each finger having an end extending beyond the bearing face and having formed on its inner edge a detent spaced from the bearing face to provide a recess to fit over a fold form or label bearing against the bearing face, and a presser member to press the fold of the label against the bearing face.

19. In a label cutting and folding machine, the combination of means for supplying a label strip with the labels facing upwardly, a knife to sever individual labels from the end of the strip, actuating means for the knife, feed jaws comprising an upper and a lower jaw to feed the label strip the length of an individual label and through said knife comprising a carriage for said jaws comprising means for advancing the jaws to the label and for feeding the strip and for raising the jaws after a label has been severed and is held in the jaws, actuating and timing means for controlling the movements of said carriage, a fold form on the lower jaw over the ends of which the severed ends of the individual labels are folded, a plurality of label folders each having bearing faces extending transversely of said label folder; each comprising a pair of members adjustable longitudinally of said label folders to and away from one another and having their bearing faces extending transversely of said label folder, each bearing face adapted to receive an end of a label fold form and a label, each member having a plurality of spaced flat folding fingers each finger being movable edgewise longitudinally of the folder and urged by spring means toward the transverse center line of the label folder and against a transverse stop, each of said fingers projecting from one of the bearing faces and having a detent at the inner edge and spaced from said bearing face to snap over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position, a pressing position and finally an ejecting position with the folder in said pressing position being disposed above said jaws after a label has been severed and is held in said feed jaws, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members to permit the face of the presser to press the fold of the label against the bearing faces at the points between the fingers, means to raise said presser to said folder, a packer means for each folder engageable with a cam on the inner edge of each finger to force the fingers apart to release the label and having an end to force the label from the folder into a packer tube, and actuating means engageable with said packer means when its folder is at the expelling position of the turret, and means for indexing said turret between said positions thereof and for holding each folder successively at each position, said actuating, timing and indexing means having driving means and being so timed that a folder is held at the folding position of the turret while the jaws move upwardly to insert a label in said folder and are then retracted and to permit the presser to simultaneously press the label in the folder at the pressing position and to simultaneously permit ejection and packing of the label from the folder at the ejecting position of the turret.

20. In a label cutting and folding machine, the combination of means for supplying a label strip with the labels facing upwardly, a knife to sever individual labels from the end of the strip, actuating means for the knife, feed jaws comprising an upper and a lower jaw to feed the label strip the length of an individual label and through said knife comprising a carriage for said jaws comprising means for advancing the jaws to the label and for feeding the strip and for raising the jaws after a label has been severed and is held in the jaws, actuating and timing means for controlling the movements of said carriage, a fold form on the lower jaw over the ends of which the severed ends of the individual labels are folded, a plurality of label folders each having bearing faces extending transversely of said label folder, each comprising a pair of members adjustable longitudinally of said label folders to and away from one another and having their bearing faces extending transversely of said label folder, each bearing face adapted to receive an end of a label fold form and a label, each member having a plurality of spaced flat folding fingers each finger being movable edgewise longitudinally of the folder and urged by spring means toward the transverse center line of the label folder and against a transverse stop, each of said fingers projecting from one of the bearing faces and having a detent at the inner edge and spaced from said bearing face to snap over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position and a pressing position with the folder in said pressing position being disposed above sad jaws after a label has been severed and is held in said feed jaws, a presser disposed at said pressing position and positioned to press a folded label held in said folder against the bearing faces of the folder, said presser being a member having a plurality of thin grooves in its face and extending thereacross of a depth to and positioned to receive the fingers projecting from the bearing faces regardless of the adjustment of the folder members, to permit the face of the presser to press the fold of the label against the bearing faces at the points between the fingers, means to raise said presser to said folder, and means for indexing said turret between said positions thereof and for holding each folder successively at each position, said actuating, timing and indexing means having driving means and being so timed that a folder is held at the folding position of the turret while the jaws move upwardly to insert a label in said folder and are then retracted and to permit the presser to simultaneously press the label in the folder at the pressing position 21. In a label cutting and folding machine, the combination of means for supplying a label strip with the labels facing upwardly, a knife to sever individual labels from the end of the strip, actuating means for the knife, feed jaws comprising an upper and a lower jaw to feed the label strip the length of an individual label and through said knife comprising a carriage for said jaws comprising means for advancing the jaws to the label and for feeding the strip and for raising the jaws after a label has been severed and is held in the jaws, actuating and timing means for controlling the movements of said carriage, a fold form on the lower jaw over the ends of which the severed ends of the individual labels are folded, a plurality of label folders each having bearing faces extending transversely of said label folder, each bearing face adapted to receive an end of a label fold form and a label, each member having a plurality of spaced flat folding fingers each finger being movable edgewise longitudinally of the folder and urged by spring means toward the transverse center line of the label folder and against a transverse stop, each of said fingers projecting from one of the bearing faces and having a detent at the inner edge and spaced from said bearing face to snap over a fold form and label, each finger having a beveled nose to engage the end of a fold form being moved toward said bearing face to be forced outwardly by said end of the fold form before snapping over the fold form to fold the end of the label, a turret carrying said label folders and adapted to position said folders successively at a folding position and a pressing position with the folder in said pressing position being disposed above said jaws after a label has been severed and is held in said feed jaws, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, means to raise said presser to said folder, and means for indexing said turret between said positions thereof and for holding each folder successively at each position, said actuating, timing and indexing means having driving means and being so timed that a folder is held at the folding position of the turret while the jaws move upwardly to insert a label in said folder and are then retracted and to permit the presser to simultaneously press the label in the folder at the pressing position.

22. In a label cutting and folding machine, the combination of means for supplying a label strip with the labels facing upwardly, a knife to sever individual labels from the end of the strip, actuating means for the knife, feed jaws comprising an upper and a lower jaw to feed the label strip the length of an individual label and through said knife comprising a carriage for said jaws comprising means for advancing the jaws to the label and for feeding the strip and for raising the jaws after a label has been severed and is held in the jaws, actuating and timing means for controlling the movements of said carriage, a fold form on the lower jaw over the ends of which the severed ends of the individual labels are folded, a plurality of label folders each having bearing faces extending transversely of said label folder, each bearing face adapted to receive an end of a label fold form and a label, each member having a plurality of spaced flat folding fingers each finger being movable edgewise longitudinally of the folder, each of said fingers projecting from one of the bearing faces and having a detent at the inner edge and spaced from said bearing face to fit over a fold form and label, a turret carrying said label folders and adapted to position said folders successively at a folding position and a pressing position with the folder in said pressing position being disposed above said jaws after a label has been severed and is held in said feed jaws, a presser disposed at said pressing position and positioned to press a folded label held in said folder against the bearing faces of the folder, said presser being a member having a plurality of thin grooves in its face of a depth to and positioned to receive the fingers projecting from the bearing faces to permit the face of the presser to press the fold of the label against the bearing faces at the points between the fingers, means to raise said presser to said folder, and means for indexing said turret between said positions thereof and for holding each folder successively at each position, said actuating, timing and indexing means having driving means and being so timed that a folder is held at the folding position of the turret while the jaws move upwardly to insert a label in said folder and are then retracted and to permit the presser to simultaneously press the label in the folder at the pressing position.

23. In a label folding machine, the combination of jaws to feed the label, a turret carrying a plurality of folders, indexing means to hold said turret in position with one folder at folding position, another folder at pressing position, and another folder at ejecting position between indexing operations, said indexing means comprising a Geneva movement, a presser at pressing position, and means to insert a label in the folder at folding position, means to simultaneously cause said presser to press a label in the folder at pressing position, and means to operate simultaneously to eject the label from the folder at the ejecting position.

24. In a label folding machine, the combination of jaws to feed the label, a turret carrying a plurality of folders, indexing means to hold said turret in position with one folder at folding position, another folder at pressing position, and another folder at ejecting position between indexing operations, a presser at pressing position, means to insert a label in the folder at folding position, and means to simultaneously cause said presser to press a label in the folder at pressing position, and means to operate simultaneously to eject the label from the folder at the ejecting position.

25. In a label folding machine, the combination of jaws to feed the label, a turret carrying a plurality of folders, indexing means to hold said turret in position with one folder at folding position, another folder at pressing position between indexing operations, said indexing means comprising a Geneva movement, a presser, a pressing position, means to insert a label in the folder at folding position, and means to simultaneously cause said presser to press a label in the folder at pressing position.

26. In a label folding machine, the combination of a pair of label feeding jaws, a Geneva movement to control the movement of said jaws, a folder to receive the label from said jaws, means for indexing the folder to folding position and to position for further operations, and a second Geneva movement to control the indexing of said folder and to hold said folder in position during the dwell of said first Geneva movement while the label is being transferred from said jaws to said folder.

27. In a label folding machine, the combination of a pair of label feeding jaws, a means to control the movement of said jaws having a dwell at the end of the feeding movement, a folder to receive the label from said jaws, means for indexing the folder to folding position and to position for further operations, and a Geneva movement to control the indexing of said folder and to hold said folder in position during the dwell of said jaw feeding control while the label is being transferred from said jaws to said folder.

28. Feed jaws for feeding labels or the like in a cutting and folding machine, comprising a fixed jaw and a pivoted jaw pivoted to the face thereof by a main pivot at a point spaced from the front or gripping ends of the jaws with its inner face engaging the fixed jaw, said pivoted jaw having its rear end extending beyond said main pivot, a lever member disposed at the outer face of the pivoted jaw, said lever member having at its rear end a pivot bearing on the pivoted jaw at a point between the rear end of the pivoted jaw and the main pivot, spring means tending to force said lever member against the outer face of said pivoted member and to force said jaws together, said spring means having a fulcrum bearing on the outer face of the lever member between its ends and between the main pivot and the gripping ends of the jaws, and means for releasing the spring pressure tending to hold the jaws closed and to exert a force tending to open the jaws comprising means engaging the front end of said lever member to lift said lever member against the force of the spring means and thereby release the spring pressure by fulcruming said lever means around the pivot bearing on the pivoted jaw, whereby a fulcruming of the lever member about the fulcrum bearing of the spring means causes the rear end of the lever means to tend to pivot the pivoted jaw around the main pivot to open the jaws.

29. Feed jaws for feeding labels or the like in a cutting and folding machine, comprising a fixed jaw and a pivoted jaw pivoted to the face thereof by a main pivot at a point spaced from the front or gripping ends of the jaws with its inner face engaging the fixed jaw, said pivoted jaw having its rear end extending beyond said main pivot, a lever member disposed on the outer face of the pivoted jaw, said lever member having at its rear end a pivot bearing on the pivoted jaw at a point between the rear end of the pivoted jaw and the main pivot, a fixed rod extending from said fixed jaw between said main pivot and the gripping end of the jaw and extending through said pivoted jaw and said lever member, a head on said rod, a compression spring between said head and said lever member having a fulcrum bearing on the outer face of said lever member, a plunger passing through said fixed jaw and said pivoted jaw between said rod and the gripping ends of said jaws and engaging the front end of said lever member, and means for forcing said plunger through said jaws to lift said lever member against the force of the spring means and thereby release the spring pressure by fulcruming said lever means around the pivot bearing on the pivoted jaw, whereby a fulcruming of the lever member about the fulcrum bearing of the spring means causes the rear end of the lever means to tend to pivot the pivoted jaw around the main pivot to open the jaws, and a means to release said plunger to permit said jaws to close.

30. In an apparatus for feeding and cutting labels and the like, the combination of means for supplying a strip of labels, a knife to sever the labels from the end of the strip, means for actuating the knife, feed jaws to feed the label strip the length of an individual label, a carriage for said jaws comprising an advancing and retracting slide to advance the jaws to the label strip and to retract them from the severed label, a feeding slide movable to move the jaws in label feeding direction and to return them, and an elevating slide to elevate the jaws, means for operating said advancing and retracting slide and said elevating slide, and a Geneva movement for operating said feeding slide.

31. In an apparatus for feeding and cutting labels and the like, the combination of means for supplying a strip of labels, a knife to sever the labels from the end of the strip, means for actuating the knife, feed jaws to feed the label strip the length of an individual label, a carriage for said jaws comprising an advancing and retracting slide to advance the jaws to the label strip and to retract them from the severed label, and a feeding slide movable to move the jaws in label feeding direction and to return them, means for operating said advancing and retracting slide, and a Geneva movement for operating said feeding slide.

32. In an apparatus for feeding and cutting labels and the like, the combination of means for supplying a strip of labels, a knife to sever labels from the end of the strip, means for actuating the knife, feed jaws to feed the label strip the length of an individual label, means to open and close said jaws, a feeding slide movable to move the jaws in label feeding direction and to return them, and a Geneva movement for operating said feeding slide timed to permit said jaws to grasp the label strip during one dwell of said Geneva movement and to permit the knife to sever a label from the strip and to permit the jaws to relinquish the severed label during another dwell thereof.

33. In an apparatus of the class described for feeding and folding labels or the like, the combination of means for supplying a strip of labels face up, upper and lower cooperating feed jaws having a fold form on the lower jaw, a knife to sever an individual label from the end of the strip, elevating means to elevate the feed jaws after a feeding movement and the severing of a label, means to reciprocate the jaws in feeding direction timed to dwell during the operation of the knife and elevating means, a folder comprising a pair of downwardly facing bearing faces extending across the path of feeding of the labels and positioned to receive a label carried upwardly by the jaws when they are elevated each bearing face having cooperating folding means, and means to adjust said bearing faces to or away from one another.

34. In an apparatus of the class described for feeding and folding labels or the like, the combination of means for supplying a strip of labels face up, upper and lower cooperating feed jaws having a fold form on the lower jaw, a knife to sever an individual label from the end of the strip, elevating means to elevate the feed jaws after a feeding movement and the severing of a label, a Geneva movement to reciprocate the jaws in feeding direction timed to dwell during the operation of the knife and elevating means, a folder comprising a pair of downwardly facing bearing faces extending across the path of feeding of the labels and positioned to receive a label carried upwardly by the jaws when they are elevated each bearing face having cooperating folding means.

35. In an apparatus of the class described for feeding and folding labels or the like, the combination of means for supplying a strip of labels, feed jaws having a fold form, a knife to sever an individual label from the end of the strip, elevating means to elevate the feed jaws after a feeding movement and the severing of a label, a Geneva movement to reciprocate the jaws in feeding direction timed to dwell during the operation of the knife and elevating means, a folder positioned to receive a label carried upwardly by the jaws when they are elevated.

36. In an apparatus of the class described for feeding and folding labels or the like, the combination of means for supplying a strip of labels, feed jaws having a fold form, a knife to sever an individual label from the end of the strip, a folder comprising a pair of bearing faces extending transversely of the path of the label strip, cooperating folding members for each of said bearing faces, means to adjust said bearing faces to or away from one another, means to move said jaws toward said bearing faces to fold a label held by the jaws, and a Geneva movement to reciprocate the jaws in feeding direction timed to dwell during the operation of the knife and said jaw moving means.

37. In an apparatus of the class described for feeding and folding labels or the like, the combination of means for supplying a strip of labels, feed jaws having a fold form, a knife to sever an individual label from the end of the strip, a folder comprising a pair of bearing faces extending transversely of the path of the label strip, cooperating folding members for each of said bearing faces, means to move said jaws toward said bearing faces to fold a label held by the jaws, and a Geneva movement to reciprocate the jaws in feeding direction timed to dwell during the operation of the knife and said jaw moving means.

38. In an apparatus of the class described for feeding and folding labels or the like, the combination of means for supplying a strip of labels, feed jaws having a fold form, a knife to sever an individual label from the end of the strip, a folder, cooperating folding members therefor, means to move said jaws toward said folder to fold a label held by the jaws, and means to reciprocate the jaws in feeding direction timed to dwell during the operation of the knife and said jaw moving means.

ARTHUR ROSENTHAL.